June 3, 1941.   R. PATERAS PESCARA   2,244,214
FUEL MIXTURE FEED SYSTEM FOR INTERNAL COMBUSTION ENGINES
Filed Oct. 11, 1938   3 Sheets-Sheet 1
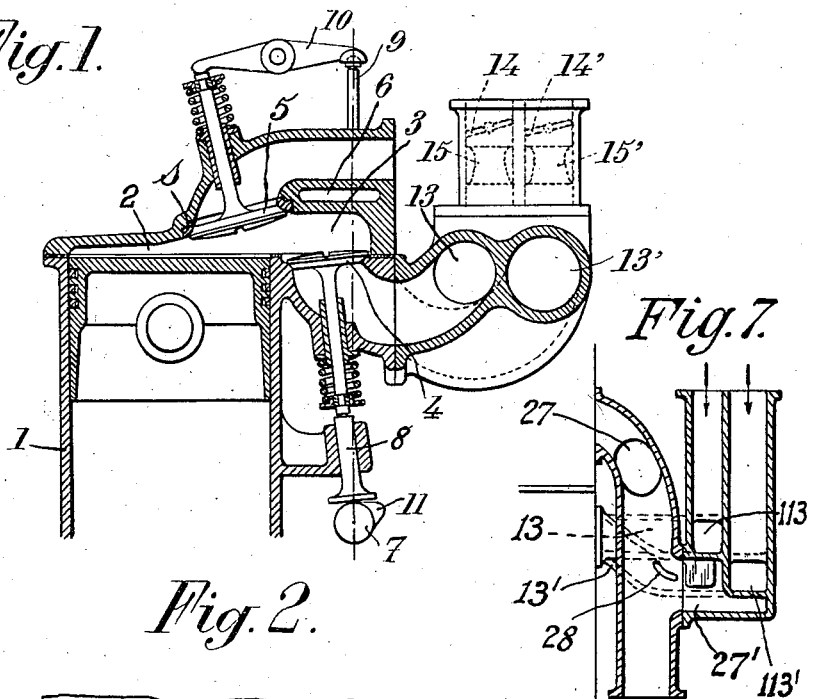
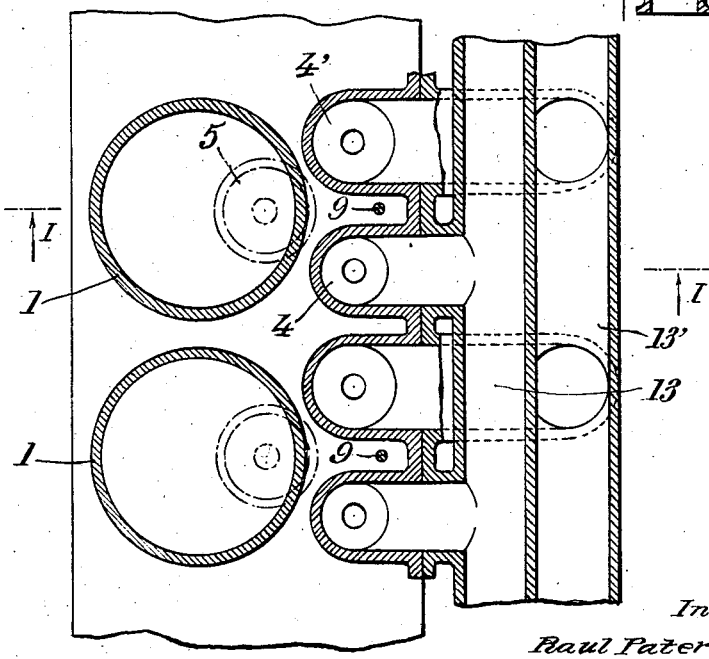

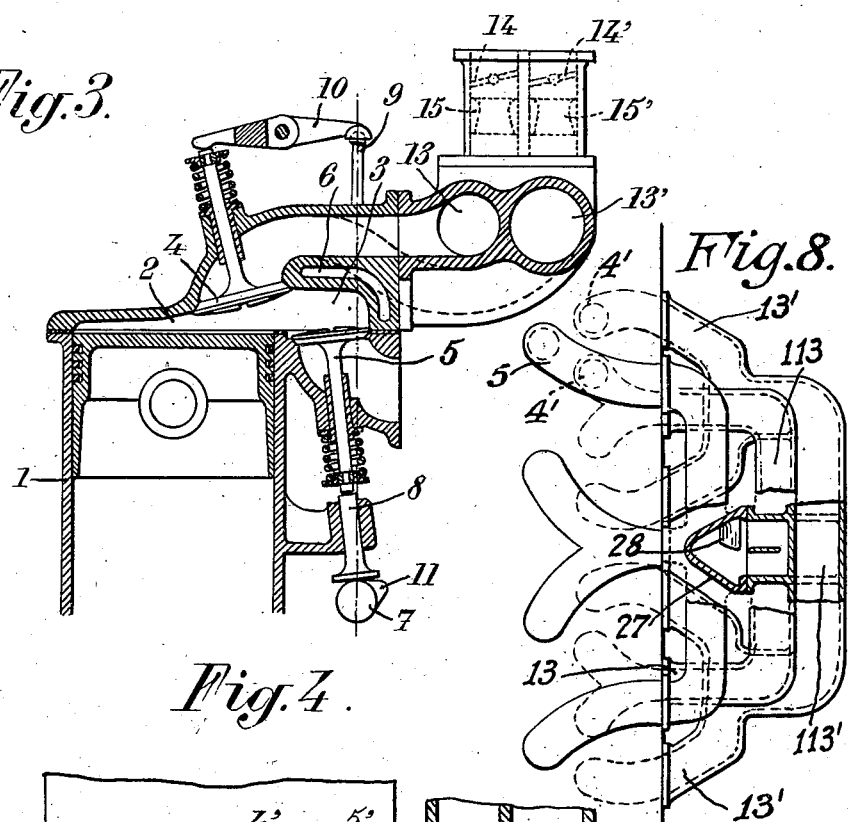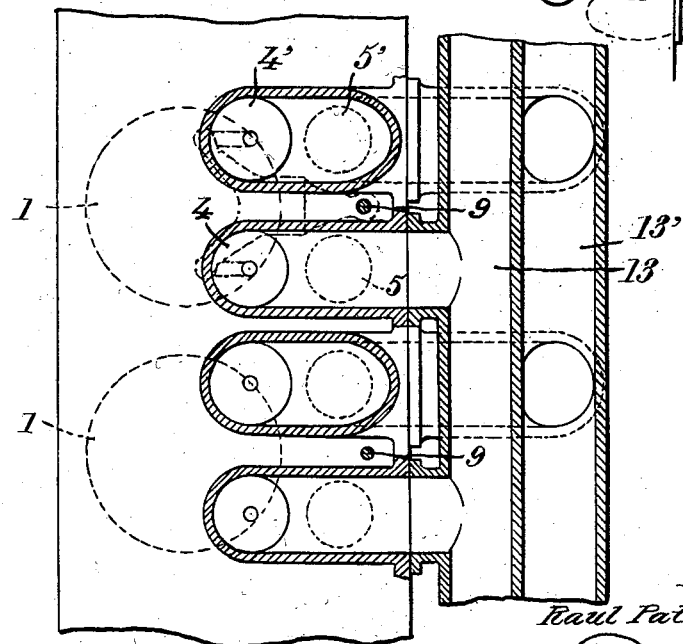

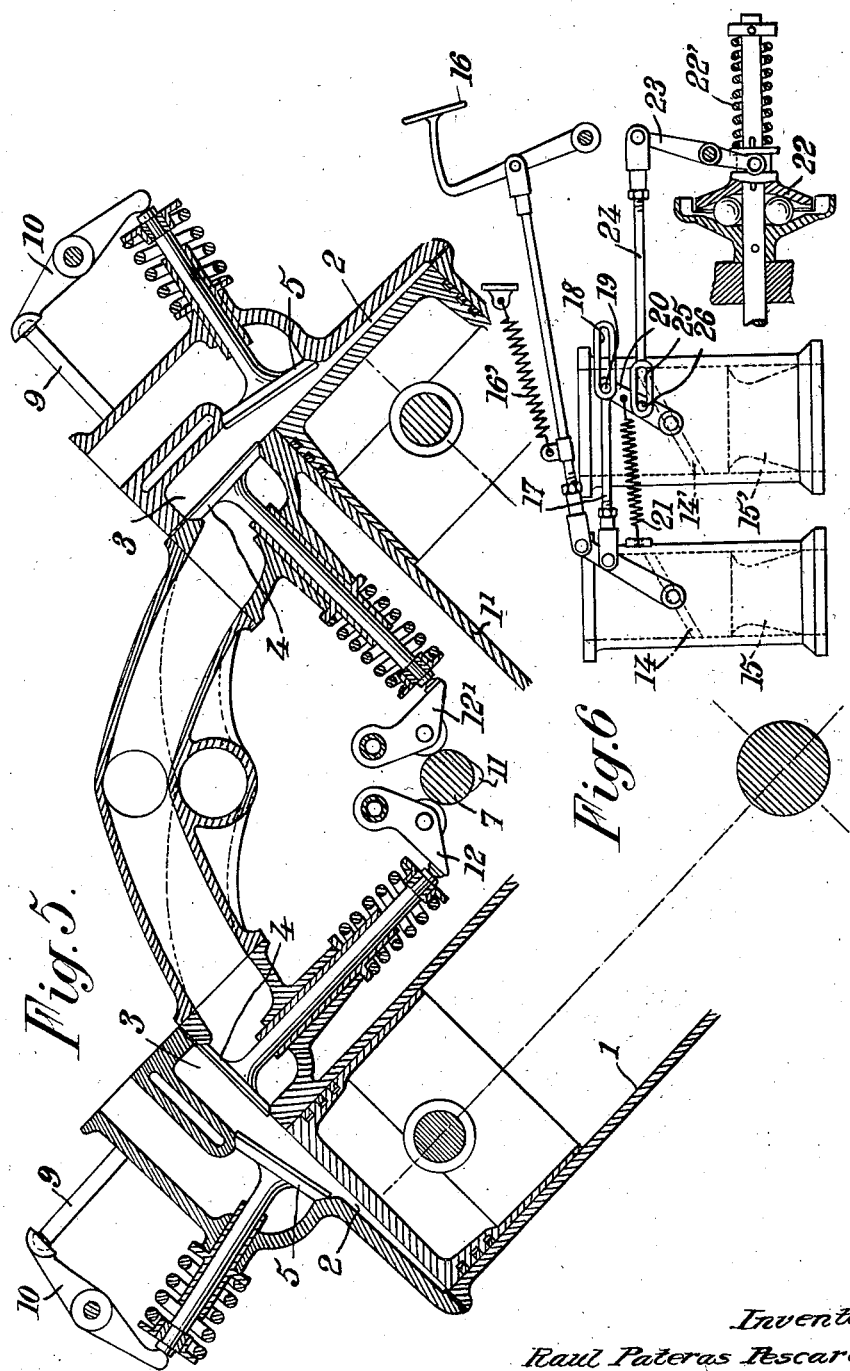

Patented June 3, 1941

2,244,214

UNITED STATES PATENT OFFICE 2,244,214

FUEL MIXTURE FEED SYSTEM FOR INTERNAL COMBUSTION ENGINES

Raul Pateras Pescara, Paris, France

Application October 11, 1938, Serial No. 234,441
In Luxemburg October 15, 1937

11 Claims. (Cl. 123—191)

The present invention relates to fuel mixture feed systems for internal combustion engines, and more especially, although not exclusively, to fuel mixture feed systems for internal combustion engines of the four stroke type.

There exist systems in which each cylinder is provided with a lateral valve chamber in the lower wall of which the valves are housed, the combustion chambers of these engines being as a rule of the so-called "turbulence" type, that is to say substantially flat on the side opposed to the valve chamber and of rounded shape on the side of the latter, in such manner as to form a disymmetric vessel of hemispherical-like shape.

In engines of this kind, it is particularly easy to control the valves through a single shaft housed in the engine crankcase (this being a very advantageous solution), but on the contrary it is practically impossible to provide important feed sections which would make it necessary to increase the depth of the valve chambers to unacceptable dimensions.

It has been suggested, in the case of engines intended to run at high speeds, to provide hemispherical combustion chambers and to place multiple valves in the upper walls of said chambers, these valves being operated through one or several overhead camshafts, but this solution is complicated, noisy and costly.

The chief object of the present invention is to provide a fuel mixture feed system which is better adapted to meet the requirements of practice than these employed up to this time, and, in particular which combines the advantages of the two solutions above referred to, without involving their particular disadvantages.

According to a feature of the present invention the internal combustion engine is provided with combustion chambers of the turbulence type provided with lateral, or side, valve chambers, and the fuel mixture feed system includes two inlet orifices, located in the lower part of each of said chambers, and an exhaust orifice, located in the upper wall of each of said chambers, said orifices being preferably provided with valves.

According to another feature of the present invention, each cylinder being provided with at least valves located in opposite walls of a combustion chamber of the turbulence type, with lateral valve chamber, these various valves are operated by a single camshaft, preferably housed on the inside of the crankcase of the engine.

According to still another feature of the present invention, each cylinder being provided with at least two inlet orifices opening into the combustion chamber thereof, these two orifices are independently fed with fuel mixture through two distinct conduits provided with means, preferably adapted to work automatically as a function of the working conditions of the engine, for bringing out of action, for certain speeds of the engine (and in particular at low speeds) one of said conduits, which is preferably given a cross section greater than that of the other conduit.

According to still another feature of the present invention, which relates to multiple valve feed systems, that is to say feed systems including several valves of the same kind for each combustion chamber of the engine, the inlet and exhaust conduits are disposed on the same side of the engine, in such manner that it is possible to make use of the exhaust gases which leave the cylinder for heating the fuel mixture that is being fed to the cylinder.

According to still another feature of the present invention, each cylinder is provided with at least two inlet orifices, preferably of different respective sections, fed with fuel mixture independently of each other through conduits of cross sections corresponding to the sections of these orifices, and at least a part of the exhaust gases is caused to flow, preferably successively, along the walls of these two conduits, the most intensive heating being preferably effected on the inlet conduit of the smallest cross section.

Other features of the present invention will result from the following detailed description of some specific embodiments thereof.

Preferred embodiments of the present invention will be hereinafter described, with reference to the accompanying drawings, given merely by way of example, and in which:

Fig. 1 is a transverse section, on the line 1—1 of Fig. 2, of an internal combustion engine of the four-stroke type provided with a fuel mixture feed system made according to a first embodiment of the present invention;

Fig. 2 is a horizontal section of the engine of Fig. 1;

Figs. 3 and 4 are views, similar to Figs. 1 and 2, respectively, showing a fuel mixture feed system made according to another characteristic feature of the present invention;

Fig. 5 is a transverse sectional view of a V engine provided with a fuel mixture feed system according to the invention;

Fig. 6 is a diagrammatical view showing a control device for a fuel mixture feed system made according to the invention;

Fig. 7 is a plan view showing, on a smaller scale, a fuel mixture feed system for a four cylinder engine including some characteristic features of the present invention;

Fig. 8 is a transverse sectional view corresponding to Fig. 7.

The following examples are more especially adapted to the case of a feed system for an internal combustion engine of the four-stroke type.

Each cylinder 1 of said engine includes a combustion chamber 2, of the turbulence type, including, in a direction at right angles to that of the engine axis, a side valve chamber 3.

According to a feature of the present invention I provide in the lower wall of the combustion chamber two inlet orifices and, in the upper wall of said chamber, one orifice for the exhaust of the gases, these orifices being preferably controlled by means of valves, as it will be supposed in the remainder of the description.

Such a disposition can be given different forms, but I have found that it is particularly advantageous to have recourse to the arrangement illustrated by Fig. 1 and Fig. 2.

In this embodiment, the two inlet valves 4 and 4' are arranged side by side in the lower wall of the valve chamber 3, and the exhaust valve 5 in the upper wall of the cylinder head or of this valve chamber. Preferably, as shown by the drawings, this exhaust valve is located at a distance from the cylinder axis slightly smaller than the inlet valves, whereby the ignition plug is easier to fit, same as the means for actuating said exhaust valve.

With such an arrangement, I obtain an engine of the side valve type in which both of the side valves would be used for the inflow, a supplementary valve, opposed to the first mentioned ones, being provided for the exhaust, which permits of giving this exhaust valve a size corresponding to the sum of the inlet sections.

This distribution of the valves is particularly well adapted to the provision, in the upper wall of the valve chamber, of a large conduit 6 for the flow of a liquid intended to cool the cylinder-head and the exhaust valve.

Furthermore, this arrangement permits, in view of the space available for placing the exhaust valve, of making the whole of the cylinder-head of aluminum so as to obtain a better cooling of the engine and of fixing to said cylinder head a seat s adapted to coact with said valve.

I might also, according to a modification of this arrangement, have an overhead inlet valve and a side inlet valve, the other side valve (preferably the larger one) serving to the exhaust. This arrangement of the valves permits of reducing to a minimum the section of flow between valve chamber 3 and the combustion chamber proper, since a portion of the gases flowing through the overhead valve would not have to flow through said section.

Either in combination with this arrangement, or in different combinations, I have found that it is advantageous to have recourse to another feature of my invention, according to which, the fuel mixture feed system including at least two inlet orifices for every combustion chamber, these two orifices are fed independently through two distinct conduits 13 and 13', provided with means, preferably automatic means, for bringing out of action, at low speeds of the engine, one of said feed conduits.

Preferably, the conduit which is to be brought out of action at low speeds (for instance conduit 13') and eventually the corresponding valve, 4', are made of cross sections larger than the respective cross sections of conduit 13 and valve 4, which serve to feed the engine with fuel mixture at all speeds thereof.

It will be readily understood that this arrangement will permit of compensating for the reductions of the driving torque which would tend to occur at very low speeds, due to the great area of the inlet orifices.

As a matter of fact, at these low speeds, means, which will be hereinafter more specifically described, will bring conduit 13' out of action, that is to say will reduce the useful cross section of the inlet means, which maintains the most favorable value of the torque.

Before proceeding to described these means, it should be noted that this arrangement of two distinct feeding systems is applicable to other feed arrangements than that disclosed by Figs. 1 and 2.

For instance, in the case of engines intended to run at high speeds, according to an arrangement shown by Figs. 3 and 4, I make use not only of two inlet valves 4 and 4', but also of two exhaust valves 5 and 5'. As it is preferable to have inlet sections of greater area than the exhaust cross sections, it seems that it is advantageous, in this case, to provide the exhaust valves in the lower wall of the valve chamber 3 and the inlet valves in the upper wall of said valve chamber.

With this arrangement and when the inlet orifices open into the upper wall of the cylinder head, I obtain the following advantages:

On the one hand, I can give these inlet orifices considerable dimension without being compelled, for this purpose, to increase the depth of cylinder valve chamber 3 beyond an excessive value, as it would have been necessary if the inlet valves had been located in the lower wall of said valve chamber;

On the other hand, I reduce to a minimum the section of passage between the valve chamber and the cylinder head for the same reasons as above set forth with reference to Figs. 1 and 2.

Whatever be the special arrangement of the valves, I can, according to the present invention, provide, in a space, of the same order of magnitude as that of the chambers of side valve engines, sections of flow much more considerable than in said last mentioned engines, owing to the fact that the feed orifices are provided in opposite walls of the valve chamber.

An engine according to the invention can be fed at a higher rate, at high speeds of revolution, than a multiple overhead valve engine.

The inlet valves and the exhaust valve can be operated in many different ways. For instance they might be driven through distinct respective means.

However, according to a characteristic feature of the present invention, which is applicable whenever different valves are arranged in opposed relation, it is particularly advantageous to make use of a single camshaft 7 which is preferably housed inside the crankcase of the engine.

Advantageously, in this case, the valves located in the lower wall of the valve chamber are directly controlled by shaft 7, for instance through the intermediate of push-pieces 8, preferably slightly oblique with respect to the direction of the corresponding cylinder axis, and, on the other hand, the valves located in the upper wall of the cylinder head are operated through rods 9 and rocker arms 10 having one or several branches according as they are to control a single valve (case of Figs. 1 and 2) or two valves (case of Figs. 3 and 4 and, eventually of Fig. 5).

As both of the inlet valves (or both of the outlet valves) have the same simultaneous movements, it is possible, in some cases, to operate them through a single cam 11 (and, furthermore, through a single rocker arm provided with two branches if the two valves in question are housed in the upper wall of valve chamber 3).

It is even possible, in the case of an engine having several rows of cylinders, such for instance as a cylinder of the V type, of the kind of that diagrammatically shown by Fig. 5, not only to provide a single shaft 7 disposed in the plane of symmetry of the engine, for operating the various valves, but also to control through a single cam 11 the valves of the same kind of two symmetrical cylinders 1 and 1¹.

For instance, it is possible, for controlling side valves, to provide, as shown by Fig. 5, between camshaft 7 and the stems of said valves, symmetrical rocker arms 12 and 12¹.

With such a drive of the various valves, the fuel mixture feed system according to the present invention combines the advantages existing in a multiple overhead valve engine (improved filling of the cylinders at high working speeds, and therefore increase of the maximum power of the engine) with those of a side valve engine (control means of simple construction and of safe and noiseless working).

I will now proceed to describe the means for bringing out of action one of the conduits, 13', through which the mixture is fed to the respective inlet valves.

These means are preferably constituted in such manner that they permit of adjusting the opening of two throttle valves, such as butterflies 14 and 14', provided on two distinct carburetters 15 and 15' (or on two different sections of a multi-section carburetter), said carburetters being connected respectively on the conduits 13 and 13' and their choke tubes being adapted to the section of said conduits.

I may for instance, according to a first solution, of a particularly simple nature, which is not shown by the drawings, connect the throttle valves 14 and 14' with a kinematic system such that it permits the pilot of the vehicle to bring into play, at will and successively, carburetters 15 and 15' by acting on a single control member.

I may also, according to an improved solution, arrange means for bringing carburetter 15' into and out of action automatically in response to variations of the engine speed. Such a result is, for instance, obtained with the arrangement illustrated by Fig. 6 of the drawings.

Throttle valve 14 is positively interconnected with a control member such, for instance, as a pedal 16, adapted to be acted upon by the pilot's foot.

Throttle valves 14 and 14' are interconnected together through the intermediary of a rod 17 provided, on the side of the throttle valve 14', with a slot or slideway 18, adapted to coact with a finger 19 rigid with a control lever 20 fixed to said throttle valve 14'. This lever is constantly urged by the action of a spring 21, which tends to bring throttle valve 14' into the open position.

In order to limit the opening of said valve 14', a centrifugal device 22, of any suitable conventional type, is caused to coact with lever 20 through connecting means consisting for instance of a lever 23 and a rod 24 provided at its end with a slot 25 cooperating with a pin 26 carried by said lever 20, so as to limit the displacements thereof.

The return spring 16' of the throttle valve and the spring 22' of the centrifugal device are of a strength greater than that of spring 21.

The operation of such a mechanism is the following:

When pedal 16 is depressed, it first causes throttle valve 14 to open. Lever 20 being retained by slot 25, throttle valve 14' remains in the closed position and finger 19 moves with respect to slot 18. As the speed of the engine increases, the centrifugal device is gradually brought into play and causes lever 23 to pivot, so as to move slot 25 in the direction corresponding to the release of pin 26. Lever 20, which remains urged by spring 21, then tends to pivot also and throttle valve 14' opens until it comes into an opened position corresponding to that of throttle valve 14.

If the engine speed then drops, the centrifugal device 22 then automatically produces, through slot 25 and finger 26, the return of said throttle valve 14' into the closed position.

With such an arrangement, it will be readily understood that the antagonistic spring 22' of the centrifugal device may be arranged to keep said throttle valve 14' closed below a certain speed limit, the opening of this throttle valve occurring only when the speed of the engine has exceeded this limit. In any case, such an arrangement will permit of ensuring, below the speed limit above referred to, a speed of the inlet stream sufficient for obtaining high torques.

On the contrary, above this limit speed, the increase of the area of the cross section of the inlet passage due to the gradual opening of throttle valve 14' will permit of reducing the speed of the gaseous stream, and therefore of improving the filling of the cylinders and increasing the power of the engine at high speeds thereof.

It is then possible, according to another feature of the invention, the application of which is made particularly easy by the distribution of the valves in opposite walls of the valve chamber, to dispose on the same side of the engine the inlet conduits 13 and 13' and the outlet conduit 27, in such manner that it is possible to utilize the exhaust gases for creating hot zones in the inlet tubes without being caused to exaggerate the size and complication of the heating devices.

Although this heating can be effected in many different manners, it seems preferable, according to another feature of the present invention, to provide the more intensive heating on the conduit of smaller section.

For this purpose, I may, for instance, cause at least a part of the exhaust gases to flow along some wall portions of conduits 13 and 13'. Such a result can be obtained through the system illustrated by Figs. 7 and 8, which arrangement corresponds to the case of a four stroke engine including, for each cylinder, two inlet valves located in the lower wall of the valve chamber and an exhaust valve provided in the upper wall of the combustion chamber.

According to this arrangement, the inlet conduits 13 corresponding to the various cylinders are connected to an inlet manifold 113.

The same structur is employed for the other inlet conduits 13', which are connected to a manifold 113', preferably located at a distance from the engine slightly greater than that of manifold 113 and located below the latter.

I provide, on the outlet manifold, 27, a kind of branch 27' surrounding at least a portion of manifolds 113 and 113', the flow of a portion of the exhaust gases toward said manifolds being preferably improved by a deflector 28 provided in manifold 27 and preferably positioned in such manner that the hot gases first come into contact with manifold 113, which is of smaller section.

It will be readily understood that such an arrangement permits of obtaining a good vaporizing of the inlet mixture at low speeds of the engine (for which, as above explained, only manifold 113 is in service) while making possible a simultaneous heating of the two inlet manifolds at high speeds of the engine.

I might even consider, if necessary, adjusting the intensity of the heating, either gradually or through a hit-or-miss control, through the centrifugal device, the latter acting, in this case, in the same manner of known devices such as thermostats.

According to my invention, I obtain a feed system which has, in addition to those above set forth, many true advantages which have been sufficiently indicated, when explaining the various characteristic features above described, for making it unnecessary to give further indications.

It should be noted that some features of the present invention are applicable to other types of internal combustion engines, for instance injection engines, and this case it permits of improving turbulence under working conditions of the engine corresponding to low speeds.

Also it is pointed out that some features of the invention might be applied to the improvement of side valve engines of a known type, by adjunction of at least one overhead valve to every combustion chamber.

In a general manner, while I have, in the above description, disclosed what I deem to be practical and efficient embodiments of the present invention, it should be well understood that I do not wish to be limited thereto as there might be changes made in the arrangement, disposition, and form of the parts without departing from the principle of the present invention as comprehended within the scope of the appended claims.

What I claim is:

1. In an internal combustion engine, at least one cylinder having a combustion chamber, two inlet valves in said combustion chamber, distinct feed means connected with said valves, and centrifugal means for automatically controlling said two feed means in response to variations of the speed of said engine adapted to bring one of said feed means out of action at low speeds of said engine.

2. In an internal combustion engine, at least one cylinder having a combustion chamber, two inlet valves in said combustion chamber, two distinct conduits leading to said valves respectively, two fuel mixture feed devices connected with said conduits respectively, separate means for controlling said feed devices, respectively, and means operative both automatically and under manual control for operating said separate control means so as to bring one of said feed devices out of action when the engine speed drops below a predetermined value.

3. In an internal combustion engine, at least one cylinder having a combustion chamber, at least two inlet valves in said combustion chamber, two distinct conduits leading to said valves respectively, two fuel mixture feed devices connected with said conduits respectively, at least one exhaust valve in said combustion chamber, an exhaust conduit connected with said exhaust valve, and means for causing at least a portion of the gases of said exhaust conduit to flow successively along the walls of said inlet conduits.

4. In an internal combustion engine, at least one cylinder having a combustion chamber, at least two inlet valves of different sizes in said combustion chamber, two distinct conduits leading to said valves respectively, and of cross sections corresponding respectively to the sizes of said valves, two distinct fuel mixture feed devices connected with said conduits, respectively, at least one exhaust valve in said combustion chamber, an exhaust conduit connected with said exhaust valves, and means for causing at least a portion of the gases from said exhaust conduit to flow successively along the walls of said inlet conduits so as to heat more intensively the inlet conduit of smaller cross section.

5. In an internal combustion engine, at least one cylinder having a combustion chamber of the turbulence type, with a valve chamber on one side, two inlet valves in the lower wall of said valve chamber, said inlet valves being spaced from another in the direction of the crankshaft of the engine, means for feeding fuel mixture to said inlet valves, a single exhaust valve only in the top wall of said combustion chamber located, with respect to the direction of the crankshaft, between said two inlet valves, and means for controlling said valves.

6. In an internal combustion engine according to claim 5, said exhaust valve being located nearer the axis of said cylinder than said inlet valves.

7. In an internal combustion engine, at least one cylinder having a combustion chamber, two inlet valves of different areas opening into said combustion chamber, distinct feed means connected with said valves and having different sections corresponding to the areas of said valves, means for automatically controlling the feed means having the larger section in response to variations of the speed of said engine to render said last feed means inoperative at low speeds of the engine.

8. In an engine as claimed in claim 5, said combustion chamber being substantially flat on the side opposite the valve chamber and rounded on the side of the valve chamber.

9. In an internal combustion engine, at least one cylinder having a combustion chamber of the turbulence type, with a valve chamber on one side, two inlet valves in the lower wall of said valve chamber, said inlet valves being spaced from another in the direction of the crankshaft of the engine, means for feeding fuel mixture to said inlet valves, a single exhaust valve only in the top wall of said combustion chamber located, with respect to the direction of the crankshaft, between said two inlet valves, and means for controlling said valves, said inlet valves having different areas.

10. In an engine as claimed in claim 5, said exhaust valve being at least partially in alignment with said cylinder.

11. In an engine as claimed in claim 5, said exhaust valve lying at least in part on the same side of the cylinder axis as said inlet valves.

RAUL PATERAS PESCARA.